United States Patent [19]

Thomas

[11] Patent Number: 5,036,332

[45] **Date of Patent: * Jul. 30, 1991**

[54] MULTI-MODE FEED SYSTEM FOR A MONOPULSE ANTENNA

[75] Inventor: Delmer L. Thomas, Camarillo, Calif.

[73] Assignee: Datron Systems Incorporated, Simi Valley, Calif.

[ * ] Notice: The portion of the term of this patent subsequent to Jul. 18, 2006 has been disclaimed.

[21] Appl. No.: 387,137

[22] Filed: Jul. 31, 1989

[51] Int. Cl.[5] .................... H01Q 21/06; H01Q 19/00; G01S 13/00; H01P 1/16

[52] U.S. Cl. .................................. 342/361; 342/153; 343/756; 333/21 A

[58] Field of Search ............... 342/361, 363, 365, 153; 343/756; 333/21 A

[56] References Cited

U.S. PATENT DOCUMENTS 4,849,761 7/1989 Thomas .............................. 342/153

FOREIGN PATENT DOCUMENTS 0017501 2/1981 Japan ................................. 343/756

*Primary Examiner*—Gregory C. Issing
*Attorney, Agent, or Firm*—Edward A. Sokolski

[57] ABSTRACT

A monopulse antenna feed system utilizing multiple modes within the feed. A TEM mode and two $TE°_{11}$ modes that are orthogonal and in phase quadrature are utilized in the antenna feed system to provide tracking information and data communication from a far-field source of circularly polarized radiation. The output from a port that is responsive to the TEM mode is compared with the output from a port that is responsive to the $TE°_{11}$ modes to obtain tracking information and the output from the latter port also provides a channel for communication of data. The phase of the TEM mode relative to the phase of the $TE°_{11}$ modes is indicative of the angular rotational position of a far-field source relative to the axis of the feed system and the relative amplitude of the TEM mode is indicative of the angular displacement of the far-field source away from the axis of the feed system.

1 Claim, 2 Drawing Sheets

MULTI-MODE FEED SYSTEM FOR A MONOPULSE ANTENNA

BACKGROUND OF THE INVENTION

This invention pertains to radar and communication antenna systems. More particularly this invention pertains to monopulse antenna systems wherein the antenna system provides means not only for concentrating the electromagnetic radiation pattern of the antenna but also for tracking of objects or sources tihin the radiation pattern of the antenna.

DESCRIPTION OF THE PRIOR ART

Numerous antenna systems have been constructed which provide means for transmitting and receiving electromagnetic energy as well as for tracking a source of such energy within the electromagnetic far-field of the antenna. Some such systems utilize a mechanically nutating feed system which moves in a periodic manner so as to cause the radiation pattern of the antenna to nutate and thus provide a means for sensing the location of a source of electromagnetic energy within the radiation pattern of the antenna. The source of such electromagnetic energy may be either an object having an active transmitter located therein or an object that reflects incident electromagnetic energy.

Monopulse antennas have been constructed which utilize a fixed-feed system consisting in some instances of two or more horns arranged such that by comparison of the amplitudes and/or relative phases of the signals received at each of the horns, one can obtain sufficient information for tracking and locating an object in the far-field of the antenna.

SUMMARY OF THE INVENTION

The present invention utilizes a single feed horn connected to a wave-guide that supports multiple modes of electromagnetic wave propagation within the guide. In the preferred embodiment, the wave-guide includes an axial center conductor and supports a TEM mode as well as two orthogonally oriented $T_{11}$ modes. The TEM mode generates a far-field pattern with an axial null. Each of the TE modes generates a far field pattern with a maximum on axis. The two $TE_{11}$ modes are orthogonally oriented and in phase quadrature with each other so as to generate a circularly polarized far-field. When transmitting, the two $TE_{11}$ modes are generated from a single $TE_{11}$ mode with the wave-guide by means of a polarizer located within the wave-guide. During reception, the two $TE_{11}$ modes induced by the incident fields are combined by the polarizer into a single $TE_{11}$ mode within the wave-guide.

The TEM mode is separated from the combined $TE_{11}$ modes to provide two outputs, one of which is responsive to the combined $TE_{11}$ modes and one of which is responsive to the TEM mode. The phase and amplitude of the TEM mode relative to the combined $TE_{11}$ modes that is induced by circularly polarized electromagnetic radiation from an object in the far-field is dependent upon the position of the object relative to the axis of the feed horn. The relative phase is dependent upon the angular rotation of the offset of object 1 relative to the axis and the relative amplitude is dependent upon the angular displacement of the object from the axis. Thus the comparison of the two outputs provides a means for the tracking of the object in the far-field of the antenna system.

DETAILED DESCRIPTION

In the following description the designation $TE_{11}$ refers to an electromagnetic mode of propagation in a rectangular waveguide. guide. The designation $TE_{11}$ refers to a mode of propagation within a circular coaxial wave-guide or to a distortion of such mode within coaxial conductors where the conductors have shapes other than circular.

Figure 1A:
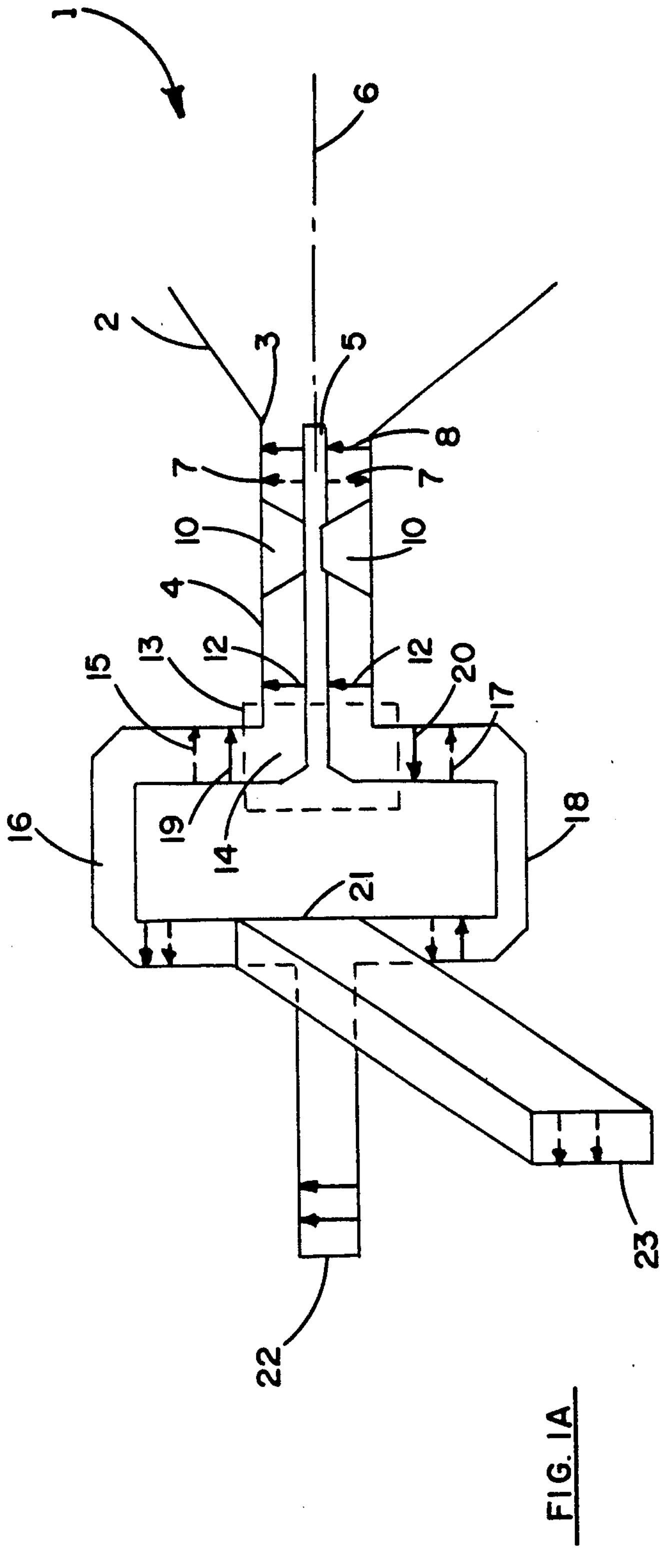
FIG. 1A functionally or schematically portrays an embodiment of the invention for tracking in two dimensions which uses a coaxial wave-guide.

Referring now to FIG. 1A which is a diagram of the functional elements of an embodiment of the invention. The embodiment utilizes the TEM mode and two orthogonal $TE_{11}$ modes, that are in phase quadrature, for two-axis tracking of a source in the far-field of the antenna. For simplicity of description, the reception of an electromagnetic signal from a source 1 in the far-field of the antenna system will be described. The antenna system, however, can operate as either a transmitting or receiving antenna system (or both).

Figure 1D:
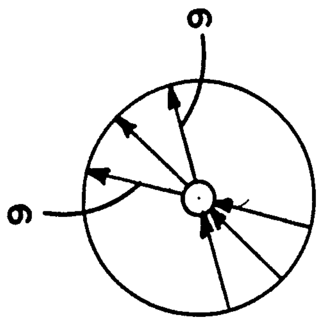
FIGS. 1B, 1C and 1D portray the TEM and $TE_{11}$ modes within the coaxial wave-guide.
Figure 1C:
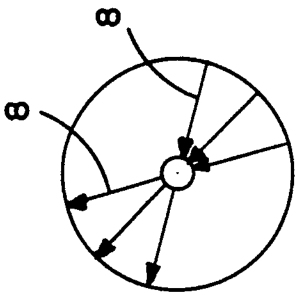
Figure 1B:
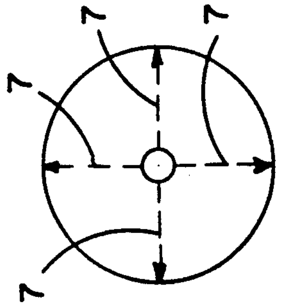

A feed horn 2 is excited at its throat 3 by electromagnetic waves in a coaxial wave-guide 4 having a central conductor 5 located along the axis 6 of the system. The coaxial wave-guide 4 supports the propagation of a TEM mode whose fields are substantially circularly symmetric about the central conductor 5 and have electric components oriented in the manner represented by arrows 7 in the pictorial representation of the TEM mode in FIGS. 1A and 1B. Coaxial wave-guide 4 can have either a circular or substantially square cross-section. The TEM mode in the throat of horn 2 has a far-field null on the axis 6 and linear polarization whose orientation is normal to axis 6.

Wave-guide 4 also supports the propagation of two $TE_{11}$ modes. For the embodiment depicted in FIG. 1A, the orientation of the electric field in the first of the two $TE_{11}$ modes at the throat 3 of horn 2 is represented by arrows 8 in FIGS. 1A and 1C. The orientation of the electric field of the second $TE_{11}$ mode at throat 3 is depicted by arrows 9 in FIG. 1D. The electric fields in the second $TE_{11}$ mode are rotated about axis 6 by 90 degrees relative to the electric fields in the first $TE_{11}$ mode and are in phase quadrature with the electric fields in the first $TE_{11}$ mode. The two $TE_{11}$ modes in the throat of horn 2 have a far-field that is circularly polarized near axis 6 with a maximum on axis 6.

In traversing the length of coaxial wave-guide 3 (during reception), the two $TE_{11}$ modes at the throat 3 of horn 2 pass through polarizer 10 and are phase-shifted and combined into a single $TE_{11}$ mode propagating in part 11 of coaxial wave-guide 3, which single mode is oriented as indicated by arrows 12. The two $TE_{11}$ modes in throat 3 are rotated by angles of 45 degrees to each side of the $TE_{11}$ mode propagating in part 11 of coaxial wave-guide 3. Polarizer 10 is a slab of dielectric material extending diagonally across the interior of the waveguide. The edges of the slab are tapered so as to provide the desired phase shift and impedance matching. When viewed as a transmitting antenna, polarizer 10 splits the single $TE_{11}$ mode in portion 11 into two orthogonal $TE_{11}$ modes at throat 3 that are in phase quadrature. The two $TE_{11}$ modes at throat 3 correspond to either a right-hand or left-hand circularly polarized electromagnetic wave in the far-field of horn 2 depending upon the relative phase shifts of the two $TE_{11}$ modes.

Although the invention is described as including a feed horn 2, it should be understood that in appropriate circumstances, feed horn 2 could degenerate simply to the opening at the end of coaxial wave-guide 4.

Referring again to FIG. 1A, the portion of the wave-guide structure enclosed by dashed line 13 is a mode transformer 14 which transforms the TEM mode in the coaxial wave-guide 4 into a $TE_{10}$ mode, represented by arrow 15, traveling in rectangular wave-guide 16 and a second $TE_{10}$ mode, represented by arrow 17, traveling in rectangular wave-guide 18, which modes may be referred to as "transformed TEM modes." Wave-guides 16 and 18 support only the propagation of the $TE_{10}$ mode. Mode transformer 14 also transforms the $TE^{o}_{11}$ mode in the multi-mode coaxial waveguide 4 into a $TE_{10}$ mode represented by arrow 19 in wave-guide 16 and a second $TE_{10}$ mode represented by arrow 20 in wave-guide 18, which modes may be referred to as "transformed $TE^{o}_{11}$ modes." As indicated in FIG. 1A, the relative phases of the $TE_{10}$ modes represented by arrows 19 and 20 are contrary to those of the modes represented by arrows 15 and 17.

The $TE_{10}$ modes in wave-guides 16 and 18 are combined in magic tee 21 so as to produce an output at the series port 22 of the magic tee responsive to the $TE_{11}$ mode in the multi-mode coaxial wave-guide 4 and to produce an output at the shunt port 23 of the magic tee responsive to the TEM mode in the multi-mode coaxial wave-guide. It should be understood that, in other configurations, strip line or coaxial devices may be used in place of the magic tee to perform the function of the magic tee, that is, to function as a hybrid combiner.

For a circularly polarized wave emitted by source 1, the phase of the signal at shunt port 23 (which is responsive to the TEM mode) can be compared to the phase of the signal at serial port 22 to determine the angular rotational position of source 19 relative to axis 6. Because of the nature of the far-field of the antenna that corresponds to the TEM mode in horn 2 and the far-field that corresponds to the two $TE_{11}$ modes in the horn, the phase of the output at shunt port 23 relative to the phase of the signal output at serial port 22 is determined by the rotational angular relationship of source 1 about axis 6.

The amplitude of the output at port 23 relative to the output at port 22 is dependent upon the angular displacement of source 1 away from axis 6. Accordingly, a comparison of the phase and amplitude of the output of shunt port 23 with the output of series port 22 can be used to obtain tracking information with respect to source 1.

Because the output of series port 22 exhibits a maximum rather than a null on axis, it may be used for the reception of data from far field source 1.

Figure 2:
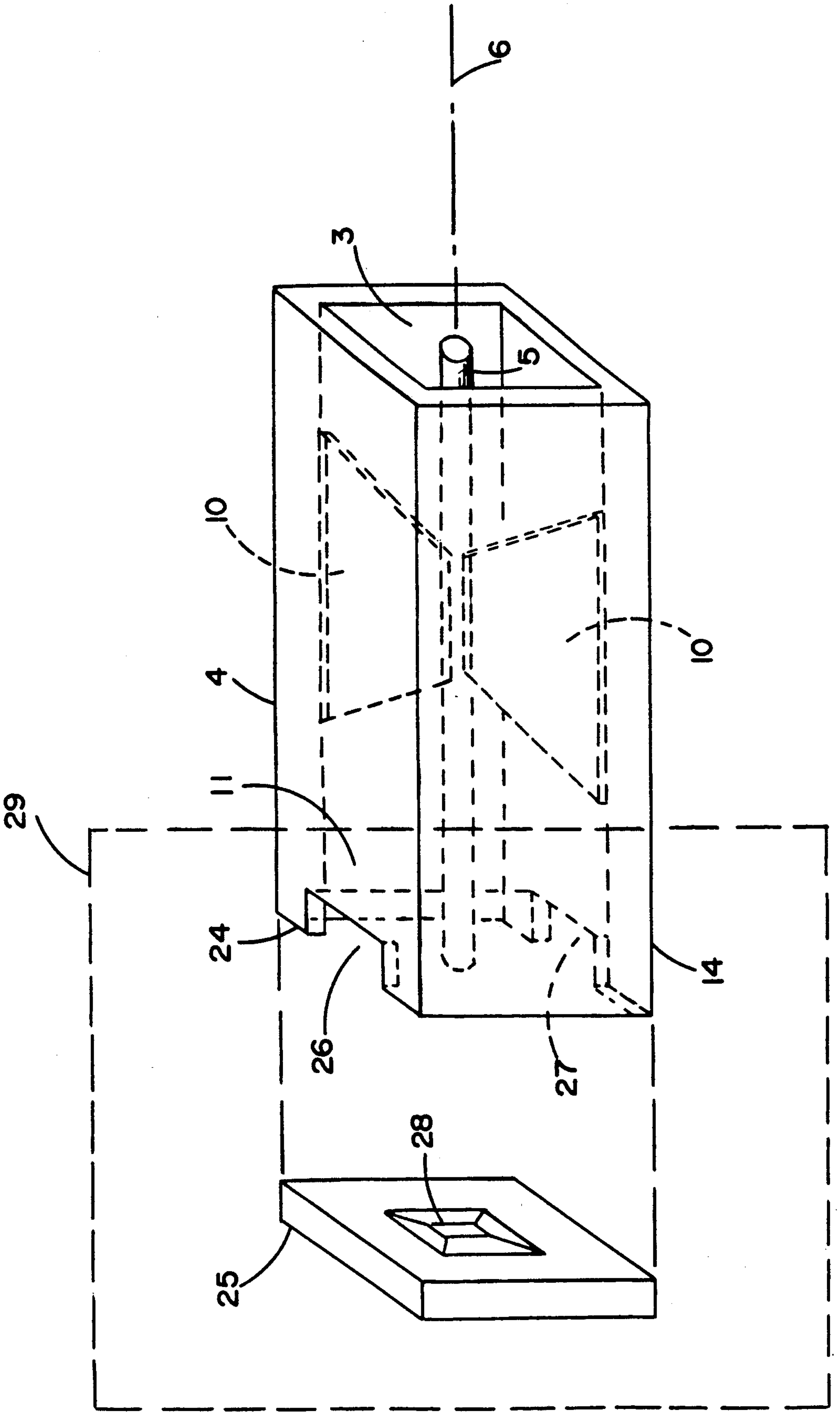
FIG. 2 depicts the coaxial wave-guide, the mode transformer and the polarizer.

FIG. 2 depicts the multi-mode coaxial wave-guide 4 and a mode transformer 14 which may be used to transform the TEM mode and the $TE_{11}$ mode into $TE_{10}$ modes propagating in the respective rectangular wave-guides. The rear end 24 of the multi-mode coaxial wave-guide 4 and end piece 25 (which are enclosed within dotted line 29) together comprise mode transformer 14. The $TE_{11}$ mode and the TEM mode within coaxial wave-guide 4 are transformed into $TE_{10}$ modes exiting from ports 26 and 27. A matching obstacle 28 on block 25, when assembled to the rear end 24 of wave-guide 4, provides part of the matching for the mode transformer. The matching obstacle in the shape of a pyramid acts as a mitered bend in the wave-guides. The heights of the rectangular wave-guides attached to ports 26 and 27 are adjusted to obtain matching of the $TE_{11}$ mode to the $TE_{11}$ modes in the rectangular guides. The heights of these wave-guides are then tapered to a standard height for the junctions with magic tee 21. By appropriate selection of the dimensions of coaxial wave-guide 4 and of the central conductor 5, a rough match of the impedances for the TEM mode and the related $TE_{11}$ modes also can be obtained.

I claim:

1. A multi-mode feed system for a monopulse antenna for two-dimensional tracking of and/or communicating data to or from an object in the electromagnetic far-field of the antenna comprising:

a hybrid combiner having first and second input ports and a sum and a difference output port;

a feed horn;

a multi-mode wave-guide having a central coaxial conductor and having front and rear openings, the multi-mode wave-guide supporting a first electromagnetic wave propagation mode of the TEM type and a second and a third electromagnetic wave propagation mode of the $TE_{11}$ type near the front opening and a fourth electromagnetic wave propagation mode of the $TE_{11}$ type near the rear opening;

the multi-mode wave-guide having a polarizer located therein;

a mode transformer having a multi-mode port and first and second mono-mode ports, the multi-mode port being connected to the rear opening of the multi-mode wave-guide and the first and second mono-mode ports being connected respectively to the first and second input ports of the hybrid combiner, the front opening of the multi-mode wave-guide being connected to the feed horn, the polarizer transforming the second and third $TE_{11}$ propagation modes located near the front of the multi-mode waveguide, where said second and third $TE_{11}$ propagation modes are orthogonal and in phase quadrature, into the fourth $TE_{11}$ propagation mode located near the rear of the multi-mode waveguide, the mode transformer transforming the first TEM propagation mode at its multi-mode port into a first and a second transformed TEM mode at its first and second mono-mode ports respectively and transforming the fourth $TE_{11}$ propagation mode at the multi-mode port into a first and a second transformed $TE_{11}$ mode at its first and second mono-mode ports respectively, means for connecting the first input port of the hybrid combiner to the first mono-mode port of the mode transformer, means for connecting the second input port of the hybrid combiner to the second mono-mode port of the mode transformer, the sum output (shunt) port of the hybrid combiner providing a sum output responsive to the first TEM propagation mode and the series output port of the hybrid combiner providing an output responsive to the fourth $TE_{11}$ propagation mode, the output from the sum output port being compared with the output from the series output port to provide tracking data, and the output from the series output port also providing means for communicating data.

* * * * *